J. G. P. THOMAS.
DRIVING OF ROAD VEHICLES.
APPLICATION FILED SEPT. 25, 1914.
1,203,663.
Patented Nov. 7, 1916.
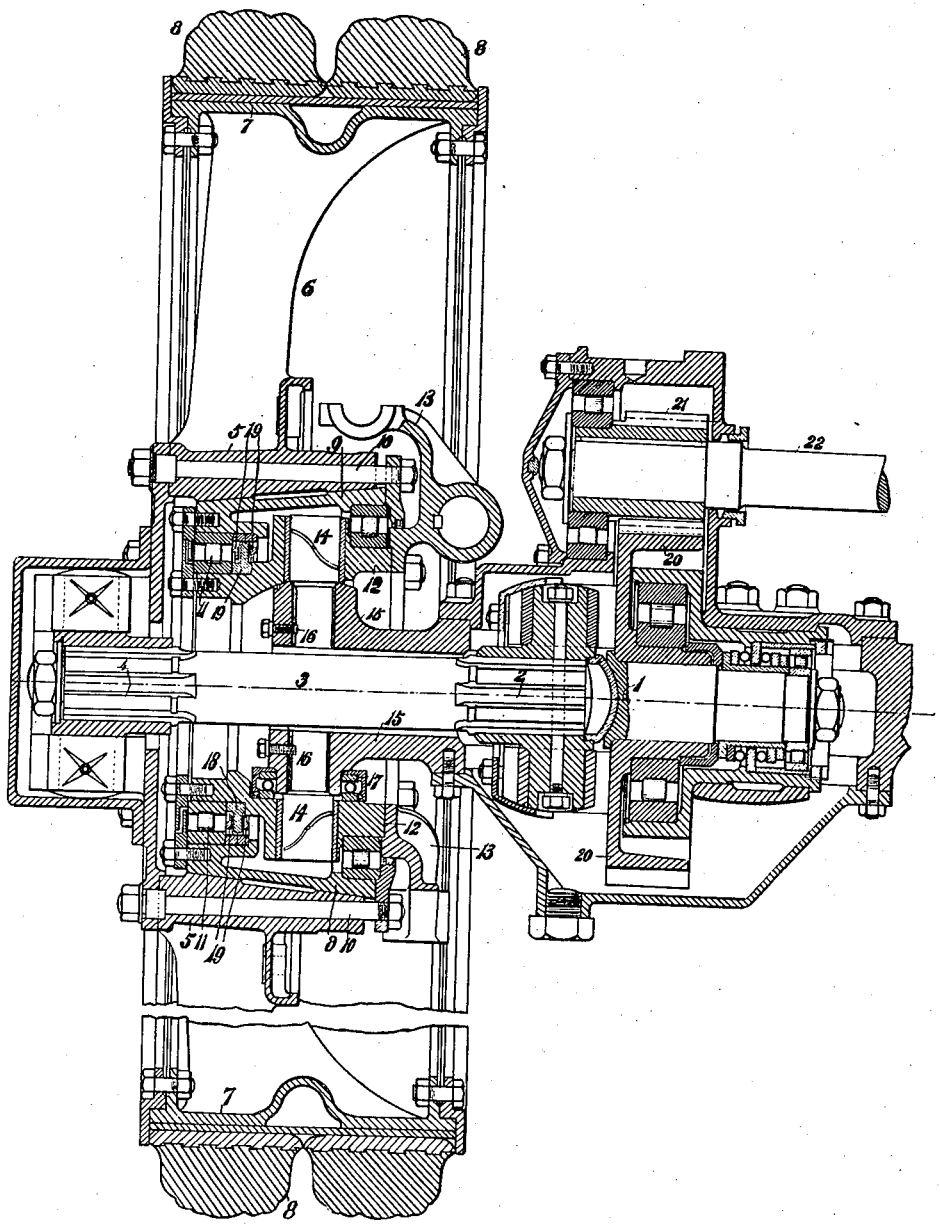
Inventor
John Godfrey Parry Thomas
per
Herbert Sefton Jones
Attorney.

Dr
UNITED STATES PATENT OFFICE.

JOHN G. P. THOMAS, OF CHISWICK, LONDON, ENGLAND, ASSIGNOR TO THOMAS FOREIGN PATENTS LIMITED, OF KENSINGTON, LONDON, ENGLAND, A CORPORATION OF GREAT BRITAIN.

DRIVING OF ROAD-VEHICLES.

1,203,663.  Specification of Letters Patent.  Patented Nov. 7, 1916.

Application filed September 25, 1914. Serial No. 863,440½.

*To all whom it may concern:*

Be it known that I, JOHN GODFREY PARRY THOMAS, a subject of the King of Great Britain, residing at 21 Ennismore avenue, Chiswick, in the county of London, England, have invented new and useful Improvements in the Driving of Road-Vehicles, of which the following is a specification.

This invention relates to an improvement in the method of driving the road wheels of vehicles, the wheels of which may have to be moved relatively to the main frame of the vehicle for steering purposes.

The object of this invention is to obtain a mechanical drive to center pivoted steering wheels, so that a constant velocity ratio shall be maintained between the power shaft and the driving wheels in a cheap and efficient manner, and so that the drive shall not in any way affect the steering of the vehicle, and further, so that in the application of the invention to heavy commercial vehicles the ground clearance below the vehicle shall be comparatively large.

To this end the invention provides the center pivoted wheel with a shaft passing freely through the middle of the wheel and connected to the wheel and to a driving shaft through universal joints equi-distant from the wheel pivot and on opposite sides thereof.

More specifically stated, the invention comprises a wheel having a large hub rotating on roller bearings on a sleeve to which the steering mechanism is connected; said sleeve turning on pivot pins supported by a frame member such as an extension of the live axle casing; while the shaft by which the wheel is driven passes through this extension and has sufficient play therein to allow of the deflection consequent upon the turning of the wheel for steering.

The accompanying drawing shows a cross section of a wheel constructed in accordance with the invention.

1 is the driving shaft of the wheel which is joined to the prime motor or other driving mechanism in any well known fashion, for example through the usual differential gear, from which two wheels are driven. This shaft is connected by a universal joint 2 to a second shaft 3 at the opposite end of which is a further universal joint 4 through which the shaft 3 is joined to the hub 5 of the wheel. The universal joints comprise in each case a cross pin carried by the shaft 3, and die blocks fitting over the ends of said pins and moving between cheeks attached to the wheel hub and the shaft 1 respectively. The right hand die blocks move in spherical guides, but on the left hand the spherical surface of the die blocks bear tangentially on the surrounding member so that they are capable of sliding longitudinally to allow for the effective shortening of the shaft 3 when it is inclined. It will be noted that the wheel hub is in two parts, the outer part 5 being integral with the spoke 6 and rim 7 which carry the tires 8. The interior of this portion is conical and fits upon the conical outer face of the inner portion 9, being drawn tightly on to the cone by the bolts 10. The inner portion 9 of the hub is supported by roller bearings 11 upon a sleeve 12. This does not rotate with the wheel but turns for steering purposes and has bolted to it the bracket 13 on which the steering mechanism terminates. The sleeve turns about two pins 14 which project radially outward from bosses formed in the hollow extension 15 of the live-axle casing. The pins are prevented from rotation by set screws 16 and suitable journal bearings are formed between their outer ends and the sleeve 12. The wheel supports the weight on the vehicle axle through a ball bearing 17. The disk or annulus 18 attached to the sleeve 12 is engaged on either side by rings 19, and forms with them a thrust bearing, transmitting lateral thrust from the wheel hub 9 to the sleeve 12. The universal joints 2 and 4 should be equidistant from the axis of the pins 14 and should have their pins or corresponding parts in the same plane.

There is sufficient play between the shaft 3 and the extension 15 to allow of any necessary deflection of the shaft occasioned by turning of the wheel for steering.

For heavy commercial vehicles it is generally necessary to insert a further reducing gear between the differential gearing and the wheel, and as a rule this is attended with difficulty in securing a large clearance above the road. In applying the invention to such vehicles the bevel or worm drive from the power shaft is set on a higher level than in standard practice, so that the shafts driven from the side members of the differential lie sufficiently above the center line of the road wheels to permit of the introduction of a reduction gear between these shafts and the wheels. This construction is shown in the right hand part of the figure. Instead of the shaft 1 being joined directly to the differential gear, as it is when no second reduction is required, it now carries a spur wheel 20 which meshes with a spur pinion 21 upon the shaft 22 which may now be supposed connected to one side member of the usual differential gear. This spur gearing is in close proximity to the wheel so that under all the center part of the vehicle a large clearance is left.

What I claim is:—

1. In a motor vehicle the combination with a wheel of a frame member, substantially vertical pivots upon said frame member supporting said wheel and arranged in the plane thereof, a shaft passing centrally and freely through said wheel, a driving shaft and universal joints mounted upon said first shaft, with co-planar pins and equidistant from said pivots connecting said shaft with the wheel and with the driving shaft respectively.

2. In a motor vehicle the combination with a wheel of a frame member, pivots in the plane of said wheel supported by said frame member, a sleeve rotatable upon said pivots, bearings interposed between said sleeve and the hub of the wheel, a driving shaft and a driving connection between said shaft and the hub of the wheel comprising universal couplings equi-distant from said pivots on opposite sides thereof and arranged with their corresponding parts in the same plane.

3. In a motor vehicle, the combination with a wheel of a frame member, substantially vertical pivots supported in said frame member in the plane of the wheel and carrying the wheel, a driving shaft, a central shaft passing freely through the center of said wheel, parallel cross-pins with their axes co-planar fast on said central shaft equi-distant from said pivots on opposite sides thereof, die blocks having spherical surfaces engaging upon said cross-pins and guides attached to the driving shaft and wheel hub and engaging the respective die blocks, the one tangentially and the other spherically.

4. In a motor vehicle, the combination with a wheel of a frame member, substantially vertical pivots upon said frame member supporting said wheel and arranged in the plane thereof, a shaft passing centrally and freely through said wheel, a driving shaft transverse to the vehicle with its axis above the center of the wheel in order to leave a substantial free space under the vehicle, an intermediate shaft, universal joints upon said first-named shaft equi-distant from said pivots connecting said first-named shaft with the wheel and with said intermediate shaft respectively, and gearing between said driving shaft and said intermediate shaft.

In testimony whereof I have signed my name to this specification in the presence of two subscribing witnesses.

J. G. P. THOMAS.

Witnesses:
   KEN. J. THOMSON,
   A. E. ODELL.